(12) United States Patent
Leroux

(10) Patent No.: US 7,431,264 B2
(45) Date of Patent: Oct. 7, 2008

(54) KNIFE GATE VALVE

(76) Inventor: Michel Leroux, 935 Heacock Road, Edmonton, Alberta (CA) T6R 2M1

( * ) Notice: Subject to any disclaimer, the term of this patent is extended or adjusted under 35 U.S.C. 154(b) by 0 days.

(21) Appl. No.: 11/017,930

(22) Filed: Dec. 22, 2004

(65) Prior Publication Data

US 2006/0131534 A1 Jun. 22, 2006

(51) Int. Cl.
*F16K 3/00* (2006.01)
(52) U.S. Cl. .................. 251/329; 251/118; 251/205
(58) Field of Classification Search ............... 251/118, 251/125, 326, 329, 205, 328
See application file for complete search history.

(56) References Cited

U.S. PATENT DOCUMENTS

| | | | |
|---|---|---|---|
| 1,752,524 A | 4/1930 | Mawby | |
| 2,596,817 A * | 5/1952 | McGovney | 251/123 |
| 3,190,305 A * | 6/1965 | Schulze | 137/255 |
| 3,906,992 A | 9/1975 | Leach | |
| 4,354,663 A | 10/1982 | Vanderburg et al. | |
| 4,798,365 A * | 1/1989 | Mayhew | 251/205 |
| 5,014,730 A * | 5/1991 | Fye | 137/454.2 |
| 5,292,105 A * | 3/1994 | Velimirovic | 251/214 |
| 5,330,158 A * | 7/1994 | Ellich et al. | 251/327 |
| 5,449,146 A | 9/1995 | Weagraff | |
| 5,895,028 A * | 4/1999 | Varady | 251/205 |
| 5,938,175 A | 8/1999 | Young et al. | |
| 6,422,535 B1 * | 7/2002 | Stone et al. | 251/327 |
| 6,745,999 B1 | 6/2004 | Heinecke et al. | |

OTHER PUBLICATIONS

"Fabri-Valve Slide Gate Valve" brochure, Engineered Valves Group, ITT Industries, USA, printed prior to Nov. 15, 2004, 4 pages.

* cited by examiner

*Primary Examiner*—John K. Fristoe, Jr.
(74) *Attorney, Agent, or Firm*—Anthony R. Lambert

(57) ABSTRACT

A valve for controlling the flow of materials is provided. The valve has a valve body having a bore, a guide attached to the valve body, a gate movable within the guide into and out of the bore, and an actuator for the gate, the bore of the valve body having a profile where the gate enters the bore, and the gate having a concave leading edge conforming to a profile of the bore. The valve may be used in throttling applications.

9 Claims, 3 Drawing Sheets

KNIFE GATE VALVE

BACKGROUND OF THE INVENTION

Gate valves are commonly used in the mining, pulp and paper, and food handling industries, among others. As known in the art, the gate moves linearly, perpendicular to the direction of flow. Typically, gate valves are used in a fully opened or fully closed position, and generally considered not suitable for throttling applications. In order to seat properly when fully closed, the typical gate valve is shaped to occupy all or substantially all of the bore. While this provides for robust sealing, the shape of the gate also has its disadvantages.

In a fully open position, areas within the bonnet or guide of a typical gate valve, known in the art as the chest area, may be exposed to flowing materials. When used in higher flow applications, this flow can have a detrimental effect on the integrity of the valve. Materials can also get clogged within the chest area of the valve body and the guide. Even if the chest area could be suitably sealed off, the traditional shape of the gate may create flow characteristics not desirable for throttling applications.

SUMMARY OF THE INVENTION

The present invention provides a gate valve for use in throttling applications. The gate valve comprises a valve body having a bore, a guide attached to the valve body, a gate movable within the guide into and out of the bore, an actuator for the gate, the bore of the valve body having a profile where the gate enters the bore, and the gate having a leading edge conforming to the profile of the bore.

These and other aspects of the invention are set out in the claims, which are incorporated here by reference.

BRIEF DESCRIPTION OF THE FIGURES

Preferred embodiments of the invention will now be described with reference to the figures, in which like reference characters denote like elements, by way of example, and in which.

DETAILED DESCRIPTION OF PREFERRED EMBODIMENTS

In the claims, the word "comprising" is used in its inclusive sense and does not exclude other elements being present. The indefinite article "a" before a claim feature does not exclude more than one of the feature being present. The phrase "concave leading edge" refers to any shape of the leading edge such that if a straight line were drawn from one side of the end of the gate to the other side of the end of the gate, no part of the leading edge would touch any part of that line, and comprises any edge forming a recess.

Figure 3:
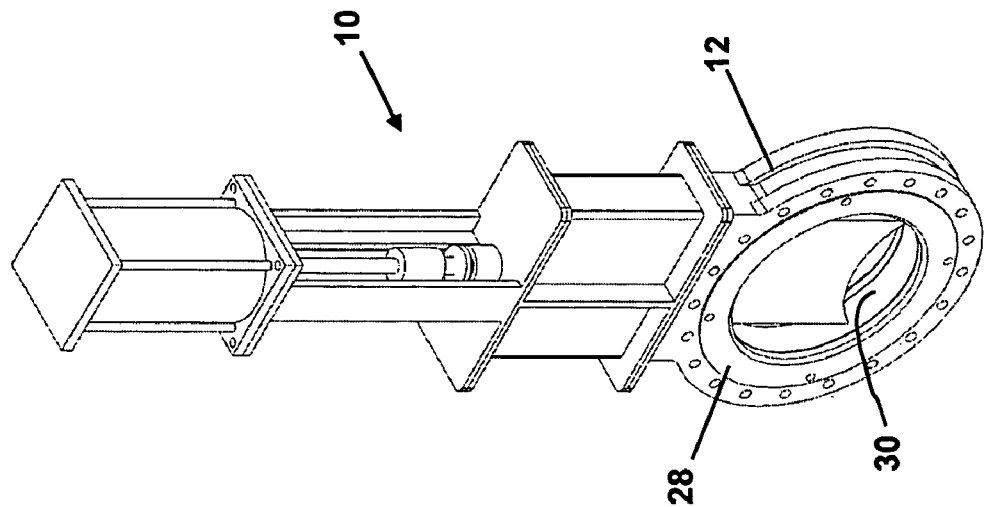
FIG. 3 is a perspective view of the valve in FIG. 1.
Figure 2:
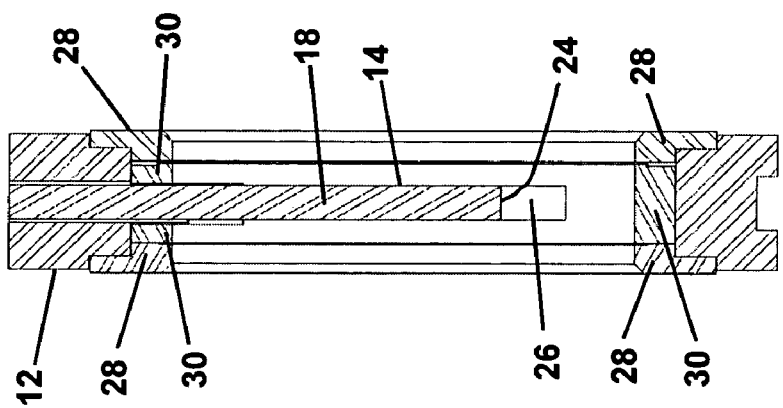
FIG. 2 is a cross-section of the valve taken along line A of FIG. 1.
Figure 1:
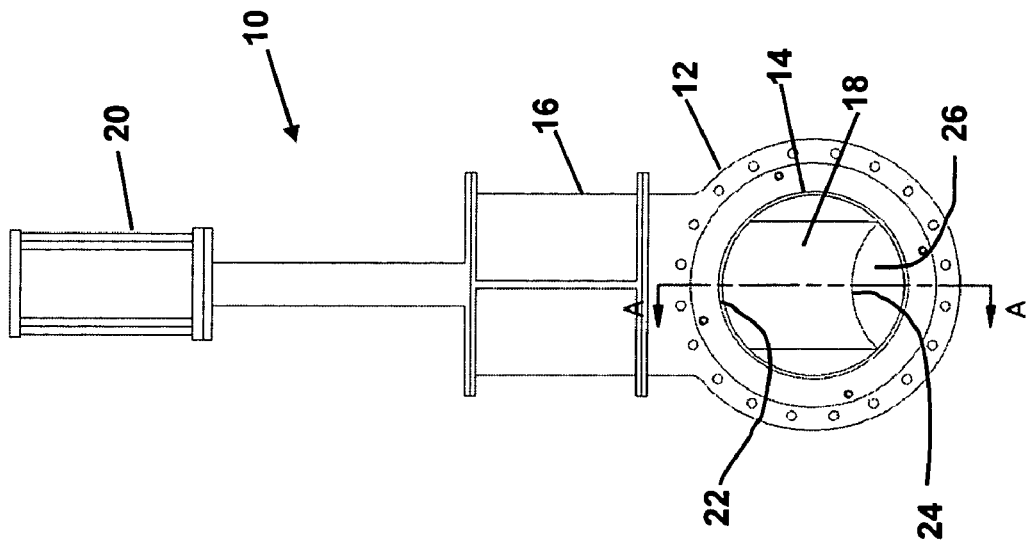
FIG. 1 is a front view of one embodiment of the valve.
Figure 6:
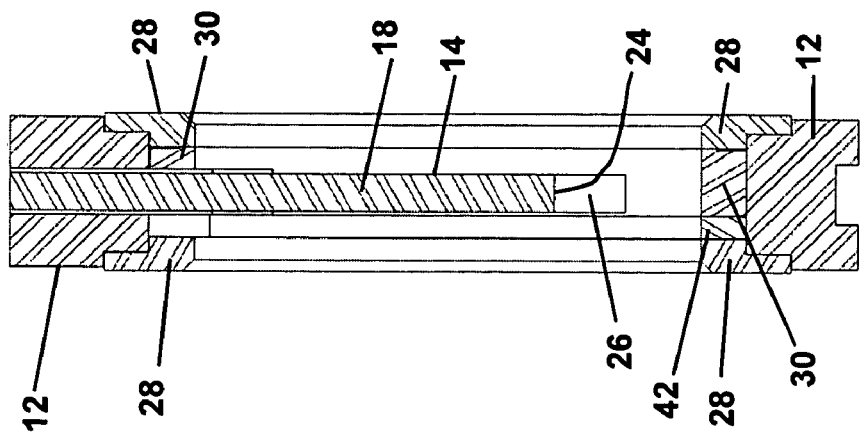
FIG. 6 is a cross-section of the valve taken along line A of FIG. 4.
Figure 5:
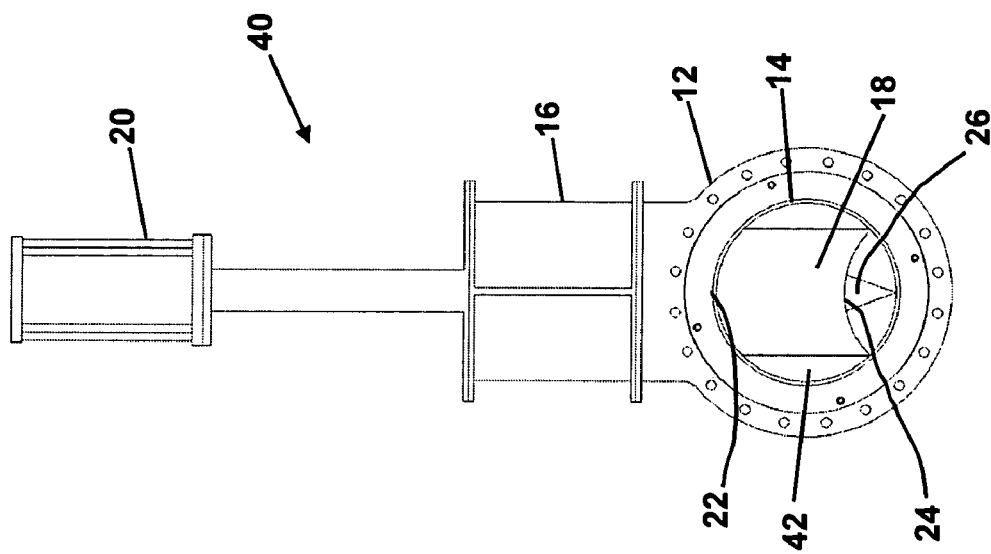
FIG. 5 is a rear view of the valve in FIG. 4.
Figure 4:
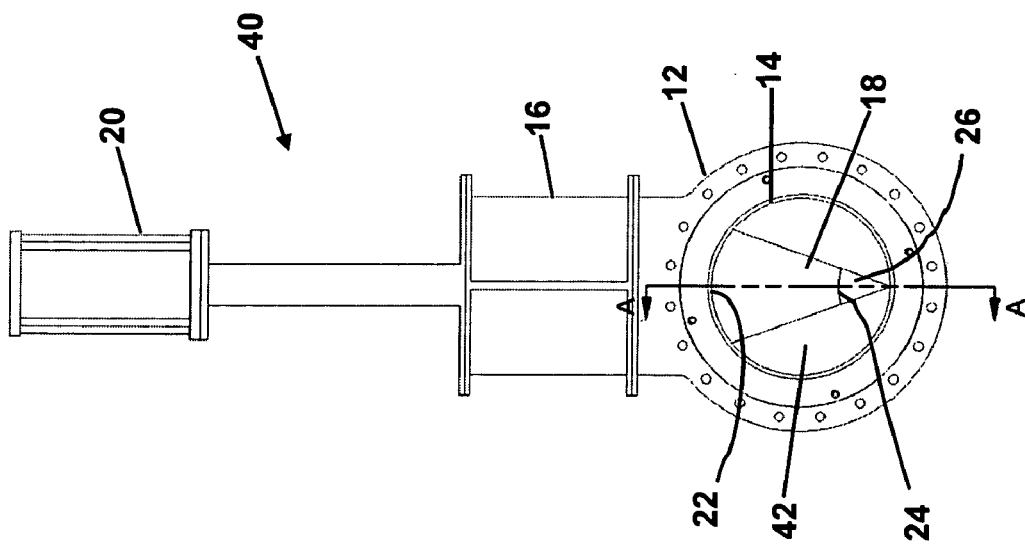
FIG. 4 is a front view of an alternative embodiment of the valve.
Figure 7:
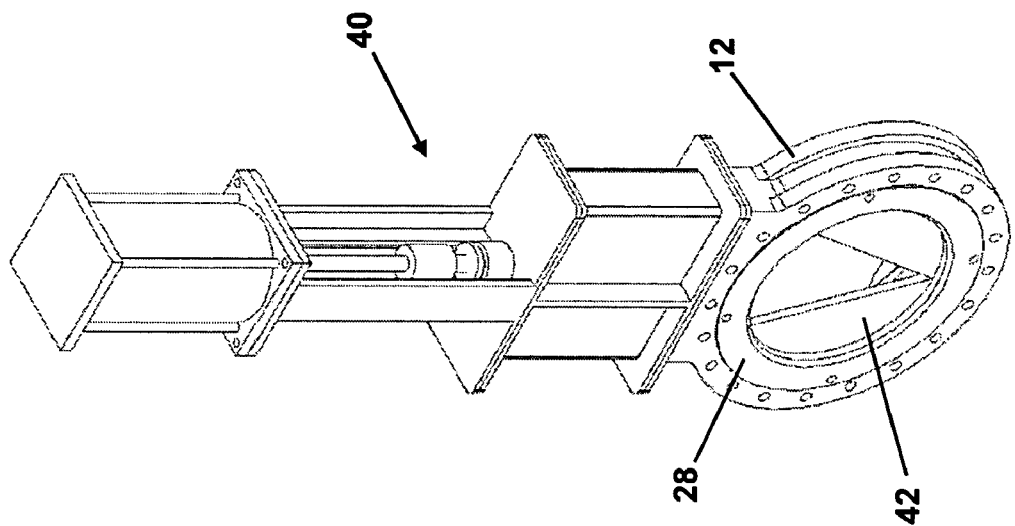
FIG. 7 is a perspective view of the valve of FIG. 4.

Referring to FIGS. 1 to 3, a valve 10 has a valve body 12 having a bore 14, a guide 16 attached to the valve body 12, a gate 18 movable within the guide 16 into and out of the bore 14, and an actuator 20 for the gate 18. In a preferred embodiment, the bore 14 is circular. The bore 14 has a profile 22, and the gate 18 has a concave leading edge 24 that conforms to the profile 20 of the bore 14. The leading edge 24 is shaped such that when the gate 18 is in a fully open position, the leading edge 24 of the gate 18 is completely flush with the profile 22 of the bore 14. This results in a complete elimination of any chest area within the valve body 12 or the guide 16.

The valve gate 18 may be made of any suitable material for the application The valve gate may also be replaceable. In a preferred embodiment, the gate 18 is a knife gate, but any type of gate capable of linear movement perpendicular to the direction of flow through the valve 10 may be used. The gate 18 is movable incrementally between a fully open position where the gate 18 is retracted within the guide 16 and a fully lowered position where the gate 18 acts in a throttling fashion within the bore 14, creating an obstruction around which the material flows. In a fully lowered position, the gate 18 will not seat in a fashion causing a total obstruction within the bore. The shape of the gate 18 inherently requires that a gap 26 exist in the bore 14 at least between the leading edge 24 of the gate 18 and the side of the bore 14 opposite the profile 22. The gap 26 may also occur between the sides of the gate 18 and the sides of the bore 14.

The valve body 12 may be unitary in construction, or it may have replaceable parts. The valve body 12 may have replaceable retainer rings 28. The retainer rings 28 may be made of any suitable material for the application. The retainer rings 28 would be installed in conventional fashion using seals known in the art. The valve body 12 may also have a replaceable valve body bore liner 30 made of any suitable material for the application The actuator 20 may be of any type suitable for the purpose, including handwheels, chainwheels, bevel gears, levers, cylinders and electric motors. In a preferred embodiment, the actuator 20 uses a cylinder.

In an alternative embodiment, as shown in FIGS. 4 to 7, the valve 40 incorporates a V-shape in the valve body 12. The V-shape may be formed with the use of a V-shaped insert 42. All other parts are the same between the valve 10 and the valve 40. The V-shaped insert 42 may be made of any suitable material for the application. The V-shaped insert 42 may be replaceable. When the gate 18 of valve 40 is raised in a fully open position, the V-shaped insert 42 creates an initial obstruction which constricts the flow of material passing through the bore 14. As the gate 18 is lowered, the V-shaped insert 42 prevents material from flowing around the sides of gate 18. Also, the gap 26 between the side of the bore 14 opposite the profile 22 and the leading edge 24 of the gate 18 is greatly reduced.

It should be understood that the V-shaped bore liner may be some other shape than a V, such as a modified V-shape, a U-shape, a diamond, a rectangle, semi-circles with parallel sides, or crescent-shaped, depending on the degree of initial obstruction and final obstruction desired and the flow characteristics desired within the bore 14 of the valve 40.

Immaterial modifications may be made to the embodiments of the invention described here without departing from the invention.

What is claimed is:

1. A valve comprising:
   a valve body having a bore;
   a guide attached to the valve body;
   a gate movable within the guide into the bore from a retracted position and out of the bore into the retracted position;
   an actuator for the gate;

the bore of the valve body having sides and a bore width between the sides, and the bore having a profile where the gate enters the bore;

the gate having a concave leading edge conforming to the profile of the bore, the concave leading edge of the gate being flush with the profile of the bore where the gate enters the bore to eliminate exposed chest area when the gate is in the retracted position; and the gate having a gate width less then the bore width to produce gaps between the sides of the bore and the gate when the gate is extended into the bore.

2. The valve of claim 1, where the gate is a knife gate.

3. The valve of claim 1 where the valve body further comprises retainer rings and a valve body bore liner.

4. The valve of claim 3 where the retainer rings and valve body bore liner are replaceable.

5. The valve of claim 1, where the valve body further comprises an insert, the insert creating an obstruction in the bore.

6. The valve of claim 5, where the insert is V-shaped.

7. The valve of claim 1 in which:

the bore is circular and has a radius;

the knife gate has parallel sides separated by the gate width;

the gate width is less than the radius of the bore; and the leading edge of the gate has a leading edge radius equal to the radius of the bore.

8. A knife gate valve comprising:

a valve body having a bore;

a guide attached to the valve body;

a gate movable within the guide into the bore from a retracted position and out of the bore into the retracted position;

an actuator for the gate;

the bore of the valve body having sides and a bore width between the sides, and the bore having a profile where the gate enters the bore;

the gate having a recessed leading edge conforming to the profile of the bore, the recessed leading edge of the gate being flush with the profile of the bore where the gate enters the bore to eliminate exposed chest area when the gate is in the retracted position; and the gate having a gate width less then the bore width to produce gaps between the sides of the bore and the gate when the gate is extended into the bore.

9. The knife gate valve of claim 8 in which:

the bore is circular and has a radius;

the knife gate has parallel sides separated by the gate width;

the gate width is less than the radius of the bore; and the leading edge of the gate has a leading edge radius equal to the radius of the bore.

* * * * *